(12) United States Patent
Subasic et al.

(10) Patent No.: US 8,953,503 B2
(45) Date of Patent: Feb. 10, 2015

(54) ISOLATION MEASUREMENT AND SELF OSCILLATION PREVENTION IN TDD-OFDM REPEATER FOR WIRELESS BROADBAND DISTRIBUTION TO SHADOWED AREAS

(75) Inventors: Bojan Subasic, Etobicoke (CA); Florin Franovici, Markham (CA)

(73) Assignee: Redline Communications Inc., Markham, Ontario (CA)

( * ) Notice: Subject to any disclaimer, the term of this patent is extended or adjusted under 35 U.S.C. 154(b) by 307 days.

(21) Appl. No.: 13/440,421

(22) Filed: Apr. 5, 2012

(65) Prior Publication Data

US 2012/0188919 A1 Jul. 26, 2012

Related U.S. Application Data

(63) Continuation-in-part of application No. 12/122,096, filed on May 16, 2008, now Pat. No. 8,175,028.

(51) Int. Cl.
*H04W 56/00* (2009.01)
*H04B 7/155* (2006.01)

(52) U.S. Cl.
CPC ........ *H04B 7/15578* (2013.01); *H04B 7/15514* (2013.01)
USPC .......................................... 370/279; 370/315

(58) Field of Classification Search
None
See application file for complete search history.

(56) References Cited

U.S. PATENT DOCUMENTS

| | | | |
|---|---|---|---|
| 6,904,266 B1* | 6/2005 | Jin et al. | 455/20 |
| 7,596,352 B2 | 9/2009 | Ding et al. | |
| 2002/0131533 A1* | 9/2002 | Koizumi | 375/345 |
| 2003/0157894 A1* | 8/2003 | Han et al. | 455/67.1 |
| 2004/0097189 A1* | 5/2004 | Bongfeldt et al. | 455/7 |
| 2006/0040611 A1* | 2/2006 | Ding et al. | 455/11.1 |
| 2007/0268846 A1* | 11/2007 | Proctor et al. | 370/279 |
| 2010/0261425 A1* | 10/2010 | Almgren et al. | 455/7 |

* cited by examiner

*Primary Examiner* — Steve Young
(74) *Attorney, Agent, or Firm* — Nixon Peabody LLP

(57) ABSTRACT

A method for determining isolation status of the RF repeater is provided. A modem in the repeater registers with a base transceiver station (BTS). Uplink output levels of a donor RF transceiver are calibrated and stored in the modem. The modem is synchronized to a BTS transmission received at the donor RF transceiver and the synchronization information is provided to a server RF transceiver of the repeater. Isolation detection and measurement can then be performed between donor transmit antenna and receive server antenna of the RF repeater and the automatic gain control parameter of donor RF transceiver and server RF transceiver are adjusted based upon the isolation detection and measurement value. The isolation and detection can be implemented in a co-processor coupled to the donor and server transceivers.

19 Claims, 6 Drawing Sheets

US 8,953,503 B2

ISOLATION MEASUREMENT AND SELF OSCILLATION PREVENTION IN TDD-OFDM REPEATER FOR WIRELESS BROADBAND DISTRIBUTION TO SHADOWED AREAS

CROSS REFERENCE TO RELATED APPLICATIONS

This application is a continuation-in-part of U.S. application Ser. No. 12/122,096, filed on May 16, 2008, which is incorporated by reference in its entirety.

TECHNICAL FIELD

The present disclosure relates to repeaters for wireless broadband distribution in fixed and mobile communication system, and more particularly, to testing isolation status to prevent self-oscillations in an RF repeater.

BACKGROUND OF THE INVENTION

In wireless networks the radio frequency (RF) coverage of base stations to subscriber stations can be impaired by a shielded space or blocked shadow areas, e.g., an underground shopping mall, a tunnel, an underground parking lot, etc. In the shadowed areas installation of a base station may not be economically or technically feasible.

An RF repeater enables service in a blind or shadowed zone by receiving a signal outside of the shadowed area at a Donor antenna and performing low-noise amplification and then reradiating the signal through a Server antenna to into the RF coverage gap. The RF repeater is interposed between a base station and a mobile terminal to improve a downlink radio signal received from the base station to the mobile terminal, and an uplink radio signal from the terminal to the base station. The repeater improves poor RF performance due to obstructions between the base station and the terminal without requiring additional base station hardware.

In deploying an RF repeater isolation between a transmit (TX) antenna and an receive (RX) antenna is required to minimize the possibility of the RX antenna receiving feedback from the TX antenna. Accordingly, upon the installation the isolation status between the antennas must be accounted for. In particular, since a time division duplex—orthogonal frequency division multiplexing/orthogonal frequency division multiple access (TDD-OFDM/OFDMA) repeaters utilizes the same frequency both the downlink antenna direction and the uplink antenna direction, the distance and direction between the antennas must be well selected in order to ensure sufficient isolation is achieved.

A conventional RF repeater and the peripheral devices start micro oscillation when a gain of the RF repeater is sufficiently increased above an isolation status value since any output is not detected in the uplink when the downlink is shut off. At this time, since a value detected in an uplink output terminal is represented as an oscillation output by the isolation, testing the isolation status by using the value has been adopted during installation of repeaters. Since the isolation testing is performed during installation any subsequent changes in the RF environment can result in oscillation and degradation of service. Service to the repeater is then required to determine the isolation status which utilizes technical resources to go to the repeater and physically test the link. While service degradation occurs network performance is decreased and operational costs are increased in having to service the repeater.

Accordingly, apparatus and methods that enable ease of isolation measurement and self-oscillations prevention remains highly desirable.

SUMMARY OF THE INVENTION

The present disclosure provides an apparatus for testing an isolation status in RF repeater that can test an isolation status in an RF repeater without help of special measuring equipment.

The present disclosure provides a method for a method of establishing and maintaining isolation status of a radio frequency (RF) repeater, the method comprising the steps of: registering the RF repeater with a base transceiver station (BTS) using a subscriber modem device coupled to the RF repeater; calibrating uplink output levels of a donor RF transceiver and storing output level values in the modem device; synchronizing the modem device to a BTS transmission received at the donor RF transceiver; providing synchronization information to a server RF transceiver of the repeater; performing isolation detection and measurement between donor transmit antenna and receive server antenna of the RF repeater; and adjusting automatic gain control parameters of donor RF transceiver and server RF transceiver based upon the isolation detection and measurement value.

There is may also be provided detecting a received signal preamble from the modem at a server antenna receiver of the RF repeater; evaluating, at the modem coupled to a donor transmit antenna, a preamble output level; evaluating, at the modem coupled to a server receive antenna, a preamble power input level; and calculating an isolation value between the donor transmit antenna and the server receive antenna using the evaluated preamble output level and preamble power input level. The method may be implemented as part of the modem functionality or may implemented using co-processor to perform preamble detection and level detection.

The present disclosure provides a modem, in a radio frequency (RF) repeater, for establishing and maintaining isolation status of the RF repeater, the method performing the steps of: registering the RF repeater with a base transceiver station (BTS); calibrating and storing uplink output levels of a donor RF transceiver and storing in the modem; synchronizing to a BTS transmission received at the donor RF transceiver; providing synchronization information to a server RF transceiver of the repeater; performing isolation detection and measurement between donor transmit antenna and receive server antenna of the RF repeater; and adjusting automatic gain control parameter of donor RF transceiver and server RF transceiver based upon the isolation detection and measurement value.

The modem may also perform detecting a received signal preamble from the BTS at a server antenna receiver of the RF repeater; evaluating a preamble output level from a donor transmit antenna; evaluating a preamble power input level from a server receive antenna; and calculating an isolation value between the donor transmit antenna and the server receive antenna using the evaluated preamble output level and preamble power input level.

The present disclosure provides a radio frequency (RF) repeater comprising: a donor transceiver coupled to a donor antenna having a transmit portion and a receive portion; a server transceiver coupled to a server antenna having a transmit portion and a receive portion; a modem, coupled to the donor transceiver and the server transceiver, the modem performing the steps comprising: registering the RF repeater with a base transceiver station (BTS); calibrating uplink output levels of a donor RF transceiver and storing output level values; synchronizing to a BTS transmission received at the donor RF transceiver; providing synchronization information to a server RF transceiver of the repeater; performing isolation detection and measurement between donor transmit antenna and receive server antenna of the RF repeater; and adjusting automatic gain control parameters of donor RF transceiver and server RF transceiver based upon the isolation detection and measurement value.

The repeater may also perform: detecting a received signal preamble from the BTS at a server antenna receiver of the RF repeater; evaluating a preamble output level from a donor transmit antenna; evaluating a preamble power input level from a server receive antenna; calculating an isolation value between the donor transmit antenna and the server receive antenna using the evaluated preamble output level and preamble power input level; and adjusting automatic gain control parameters of donor RF transceiver and server RF transceiver based upon the isolation detection and measurement value. The repeater may also perform link parameter adaptions based on BTS commands like channel bandwidth, channel frequency, wireless frame parameters etc.

BRIEF DESCRIPTION OF THE DRAWINGS

The invention will be better understood from the following description of preferred embodiments together with reference to the accompanying drawings, in which.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Embodiments are described below, by way of example only, with reference to FIGS. 1-5. An apparatus and method for determining the amount of isolation between the Donor and Server antenna in the TDD-OFDM/OFDMA repeater installation to limit the self-oscillation is provided.

Figure 1:
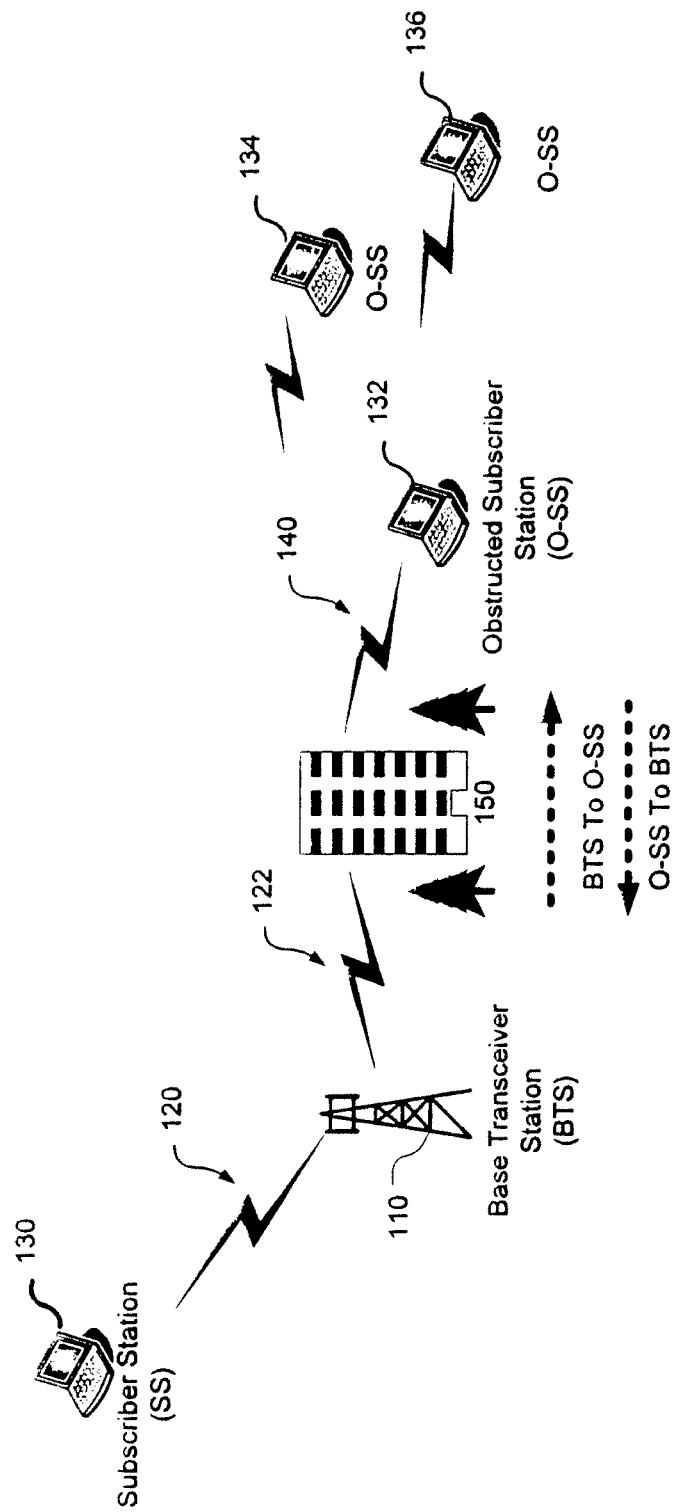
FIG. 1 illustrates a wireless network having obstructed subscriber stations.

In a broadband wireless environment, as shown in FIG. 1, OFDM/OFDMA modulated signals, such as those in IEEE 802.16 standard, the signals from a central base transceiver station (BTS) 110 are sent and received using time-division-duplexed (TDD) and time-division-multiplexed (TDM) signals to and from subscriber stations (SS) 130, 132, 134 and 136. It should be noted that the single BTS may support many SS's concurrently based upon bandwidth and traffic capacity considerations. Wireless communication between the BTS 110 and SS's is attempted by sending RF signals 120 over a radio channel. In a DD environment each SS may be allocated a unique time for transmitting and receiving data from the BTS 110. In the case of SS 130, the signal from BTS 110 is not obstructed and can be received without interference. However, signals from BTS 110 may be obstructed or severely attenuated by objects 150 in the path of the signals hindering access to and from a SS such as SS 132, 134 and 136. Objects 150, such as buildings, terrain or vegetation may block or attenuate signals 120 from the BTS and signals 140 from the SS's 132, 134 and 136. The lack of RF coverage results in a shadowed area or coverage gap in the network. The SS 132, 134 and 136 are therefore obstructed subscriber station's (O-SS) and may be limited in receiving signals from BTS 110 or transmitting signals to BTS 110. The SS or terminal may be a stationary or mobile device, either standalone or incorporated into a computing or network device, providing wireless data reception and transmission capability to a computing device.

Figure 2:
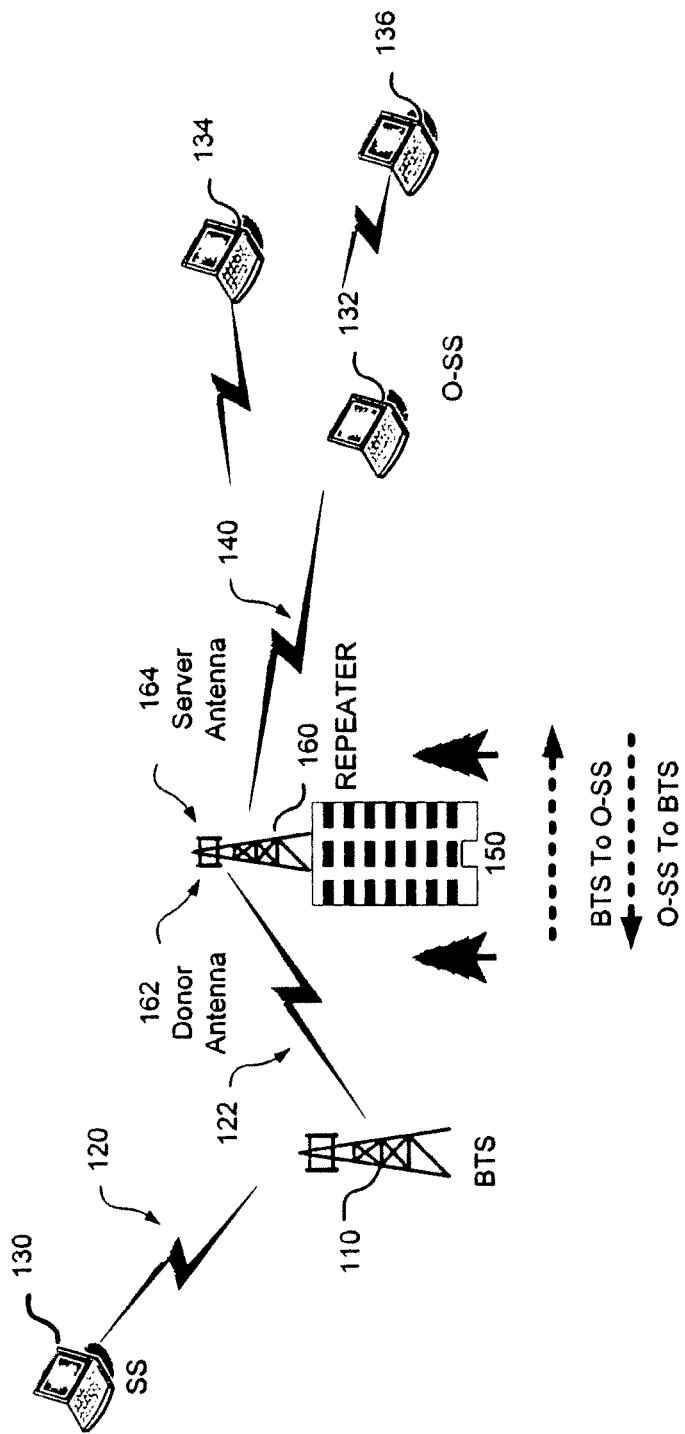
FIG. 2 is illustrates placement of an RF repeater to provide service to the obstructed subscriber stations.

To address this issue, an RF repeater can be used to provide 'gap-filling' in field deployments. The repeater is placed in areas where signals from the BTS can be received and coverage extended to the gap-areas obstructed from the BTS. For example areas in a high density urban location where buildings produce coverage gaps, or in-building or in-tunnel situations where the BTS signal is attenuated severely would be candidates for the repeater solution. The repeater receives the RF signal from the BTS and SS and compensates for degradation in the signal and the re-transmits the signal in the appropriate direction. This enables coverage to O-SS that could not otherwise be accessed from the BTS, for example, by mounting the BTS-RX unit antenna in such a way as to have a line-of-sight link to the BTS and its O-SS-RX unit in such a way as to 'look around' large obstacles that would otherwise make the O-SS-BTS link unachievable. As shown in FIG. 2, by placing a repeater 160 on for example building 150, signals from BTS 110 can now reach O-SS 132.

As shown in FIG. 2 the placement of the repeater 160 enables signals to/from the BTS to reach the O-SS's 132, 134 and 136. The RF repeater is interposed between the base station 110 and the O-SS's 132, 134 and 136, and serves to downlink a radio signal received from the BTS 110 to the O-SS's 132, 134 and 136 and uplink a radio signal from a O-SS to the BTS. Signal 122 propagates between the BTS 110 and the repeater 160 via Donor antenna 162. The Donor antenna 162 receives signals transmitted from the BTS 110 and transmits signals back to the BTS 110 from the subscriber stations. A Server antenna 164 receives signals from O-SS's and transmits signals back to the O-SS's from the BTS 110. For example, signal 122 is transmitted from BTS 110 and received at Donor antenna 162 of repeater 160. The repeater then re-broadcasts the signal through Server antenna 164 to O-SS 132 via signal 140 into the gap area improving the coverage than would have otherwise been provided by signal 122 directly due to the obstruction. When the O-SS 132 transmits back to the BTS 110, the Server antenna 164 receives the signal 140, the repeater 160 processes the signal and retransmits it via Donor antenna 162 to BTS 110 as signal 122. It should be understood that the repeater can also be used to fill gaps in in-building or tunnel type environments by locating a BTS directed Donor antenna externally and the Server antenna internally.

Deploying RF repeaters using TDD in a multiple-SS Quality-of-Service-provisioned (QoS) environment, in which different SS's are scheduled according to service level agreements (SLA) between the operator of the BTS and the end-user of the SS, entails that any device that lies in the signal path between the BTS and the O-SS needs to switch at varying intervals between receiving O-SS signals and sending them to the BTS and receiving BTS signals and sending them to the O-SS. This requires that such a device will need to demodulate and decode the BTS signal and extract a switching map that governs the transmission-reception switching times. However, in order to do so, the intermediary device may introduce a differential delay of different frequency components of the signal that passes through it, which will degrade the signal passed on by the intermediary device through introduction of a distortion in phase and amplitude into the transmission chains (BTS-OSS/O-SS-BTS) which degrade the signal. If the repeater is installed in a state that sufficient isolation is not ensured, possibly due to physical installation constraints, the repeater can cause a micro-oscillation when radio signals from the TX antenna is received by the RX antenna and sends an unnecessary RF signal to the base station, resulting in deterioration in communication quality. Therefore the issue of determining maximum gain allowable becomes one of the most important. By determining the isolation value between pairs of TX and RX antenna, the isolation value can be utilized in configuring the AGC of the repeater to ensure that output power at the respective TX antennas does not exceed the threshold at which oscillations are induced.

Figure 3:
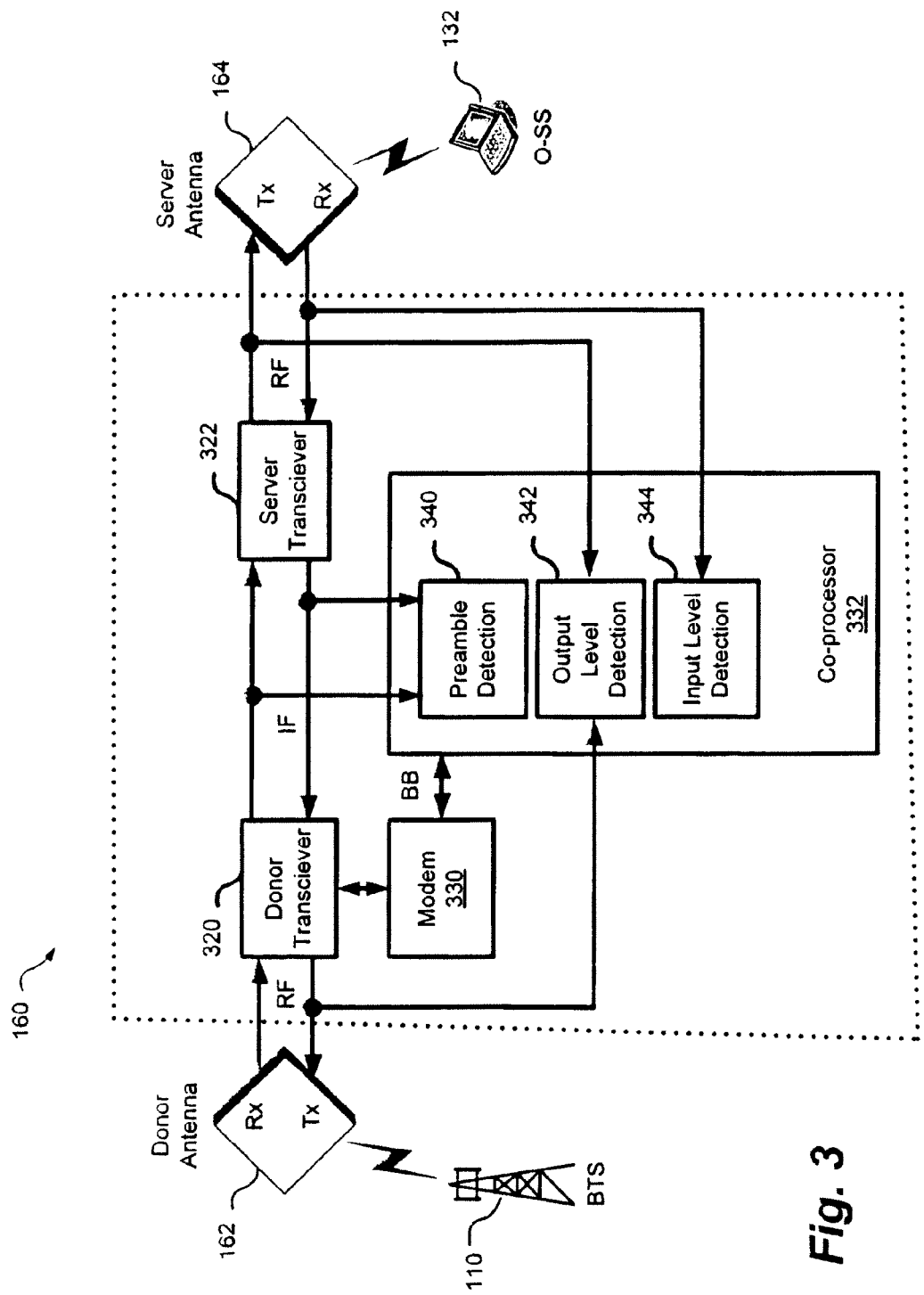
FIG. 3 is schematic representation of a repeater providing isolation measurement and self-oscillation prevention apparatus.

FIG. 3 provides an apparatus for providing testing and isolation status in an outdoor RF repeater 160. The repeater 160 is connected to a Donor antenna 162 and Coverage/Server antenna 164. Each antenna typically provides a transmit and receive portion however discrete antenna may be utilized, one for transmit and one for receive. It should be understood that although it is assumed that only one antenna will be used in each direction it is possible to utilize multiple antennas in a diversity TX and RX configuration, for example one TX and two RX antennas. A Donor RF transceiver part 320, connected to Donor antenna 162, receives a downlink RF signal from BTS 110 and transmits an uplink signal from subscriber stations, such as the O-SS 132 or an integrated subscriber station modem 330, to the BTS 110. A coverage/Server RF transceiver 322, connected to Server antenna 164, receives an uplink RF signal from O-SS 132 and transmits a downlink signal from the BTS 110 to the O-SS 132. The Donor transceiver 320 and Server transceiver 322 demodulate from RF to IF and modulate from IF to RF signals passing through the repeater and providing error correction and amplification. The transceivers may be a dual heterodyne architecture up-converting and down-converting RF and IF signals. The modem 330 provides subscriber terminal functionality within the repeater to implement testing for communicating with the BTS. Modem 330 can be based standard WiMAX™ modems such as those provided by Intel™ and performs downlink/uplink (DL/UL) map recognition and synchronization of the repeater 160 with BTS 110. The modem 330 interfaces with the Donor transceiver 320 via IF interfaces.

A modem co-processor 332 is coupled to the down-link Donor IF that is fed to Server transceiver 332. Modem coprocessor block implements down conversion to low IF, digitization by analog-to-digital converter ADC and signal processing with field programmable gate array (FPGA), application specific integrated circuit (ASIC), digital signal processor (DSP) or a dedicated system-on-a-chip (SoC). Modem 330 is responsible for synchronization of the co-processor 332 through a data interface. The co-processor 332 is therefore able to "sniff" and measure the signal characteristics in both directions UL and DL and provide measurement information's to modem 330.

In an alternative implementation the Donor RF transceiver 320 and Server RF transceivers 322 can be implemented as zero intermediary frequency (ZIF) radios where signal in DL direction is down converted all the way to baseband and then fed back to Server port. In this implementation the modem 330 and coprocessor block would operate on the baseband signal simultaneously in this approach as well.

The modem co-processor 332 can implement isolation calculation based upon input and output levels of the Donor and Server transceivers. The functions of the co-processor can be divided into one or more modules for implementing specific functions. For example, a preamble detection module 340 detects preambles generated by modem 330 and determines isolation between antennas by detecting the parasitically coupled RF energy between the Donor and Server antennas.

In an embodiment, an output level sensing module 342 may also be provided for sensing Donor antenna 162 TX signal and the Server antenna 164 TX signal to determine RF output levels. In addition, an input level detection module 344 may also be provided for sensing an RF signal level received from the Server antenna 164. These modules are not mandatory for isolation measurement. If output detection module 342 is not provided, modem UL TX power can still be evaluated based on pre-stored calibration data. However, the addition of output level sensing module 342 and input level detection module 344 can improve accuracy.

The modem 330 is responsible for synchronization of the co-processor 332. In this configuration the co-processor 322 is able to "sniff" and measure the signal characteristics in both directions uplink and downlink and provide measurement information to modem 330.

Alternatively, the Donor and Server transceivers 320 and 322 can be implemented as Zero Intermediate Frequency (ZIF) radios, where signal in downlink direction is down-converted all the way to baseband and then fed back to Server transceiver for up-conversion. In this case the modem 330 and co-processor 332 operate on the baseband signal simultaneously as well.

Figure 4:
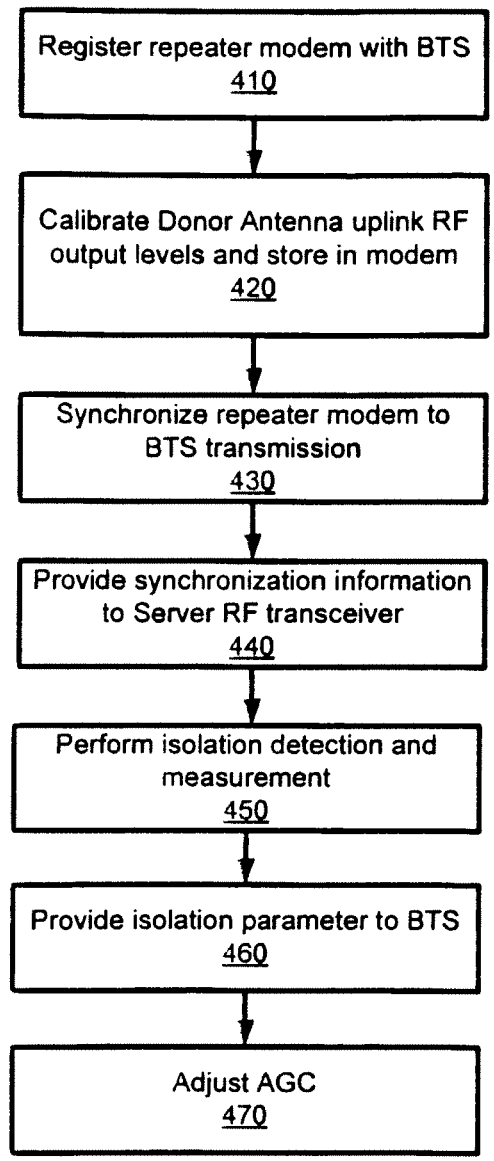
FIG. 4 is a flow chart illustrating a method of operation of a repeater providing isolation measurement and self-oscillation prevention.
Figure 5:
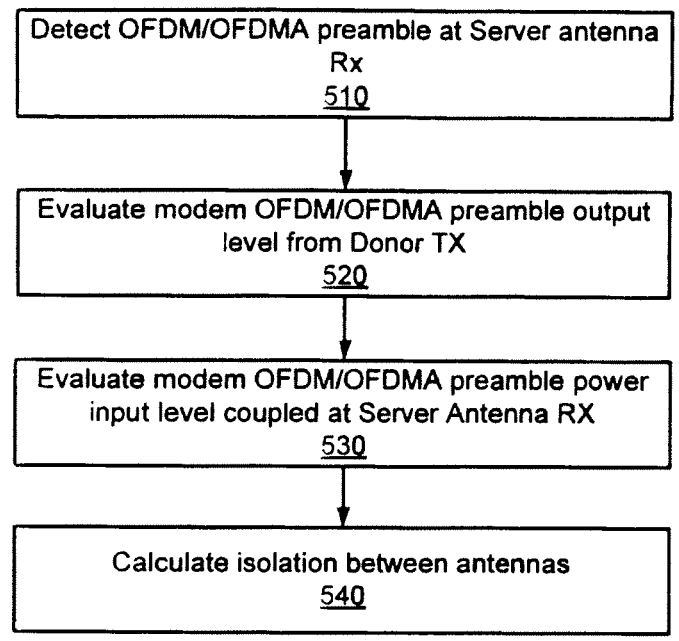
FIG. 5 is a flow chart illustrating a method of measurement and detection of isolation and self-oscillation.

FIG. 4 presents a method for testing the isolation status in the RF repeater. At installation of the repeater, modem communication with the BTS using Donor port is commenced. At step 410 the repeater registers to the BTS as any other SS device using modem 330. During this stage the Server antenna transmit portion is shutoff but the receive portion is active. The repeater uplink output in the direction from Donor antenna to the BTS is set in accordance to the standard protocol procedure as for example specified in 802.16 d/e standard. The RF output levels are calibrated and known to processor 332 built in to the modem 330 at step 420. The modem 330, by listening to the BTS transmission, is fully synchronized with the TDD operation of the BTS at step 430. This synchronization information is provided to the Server transceiver 322 at step 440. By knowing the exact timing of its own transmission modem 330 can schedule, capture and measure the RF energy present at the Server antenna 164 port during the transmission from the Donor antenna 162 port at step 450 using the modem co-processor 332. The measurement and detection of this energy level is done as shown in FIG. 5. The isolation level becomes critical parameter in the AGC algorithm since it determines the maximum amount of the gain allowable by the repeater device in order to prevent oscillation. Based upon the measurement and detection step, isolation parameters are determined and provided to the BTS 110 at step 460 by utilizing normal management channel for communication with the BTS 110 for the purpose of the OAM&P. Measurements can be repeated over time and temperature while repeater normally operates in the field. As a consequence using this method the isolation status in the RF repeater installed in the shadow area can be easily tested without any help of special equipment. The repeater AGC algorithm can then be modified based on the determined isolation parameter at step 470 to ensure that oscillation does not occur without requiring a service technician.

FIG. 5 is method of isolation measurement and detection. At step 510, the parasitically coupled OFDM/OFDMA preamble symbol transmitted by the modem is detected at from the Server transceiver 322 by the preamble detection module 340 of modem co-processor 332. This is performed by the modem 330 providing the transmitted preamble to the co-processor and informing the processor when transmission occurs. OFDM/OFDMA preamble detection significantly improves accuracy and reliability of the isolation measurement since the measurement is performed on a very well known and characterized signal form. At step 520, the OFDM/OFDMA preamble output level from the Donor TX antenna is evaluated. At step 530, the OFDM/OFDMA power input level coupled at the RX antenna is evaluated to determine an RSSI level. The co-processor 332, knowing RF output power levels from the Donor antenna and RSSI level received by the Server antenna can calculate amount of isolation between the antennas at step 540.

Preamble detection is based on transmission of the preamble from the Donor antenna 162 port during the repeater 160 registration phase with BTS 110 and during scheduled management bursts scheduled between the BTS 110 and repeater 160. During this communication Server antenna 164 port of the repeater is scheduled for receive only operation.

Parasitic coupling of the transmitted signal from the Donor antenna 162 port and received by the Server antenna 164 port is detected and measured by the repeater co-processor 332. Specifically coprocessor 332 during this communication is detecting the preamble signal and calculates the magnitude of the detected preamble signal. The repeater knows exact power level that transmits from the Donor antenna 162 port back to the BTS 110. The repeater also knows internal gain and coupling values between the Server antenna 164 port to co-processor 332 so the actual received signal level at the Server antenna 164 port can be calculated. The difference between the known Donor antenna 162 TX power level and calculated value for signal received at the Server antenna 164 isolation is obtained.

Figure 6:
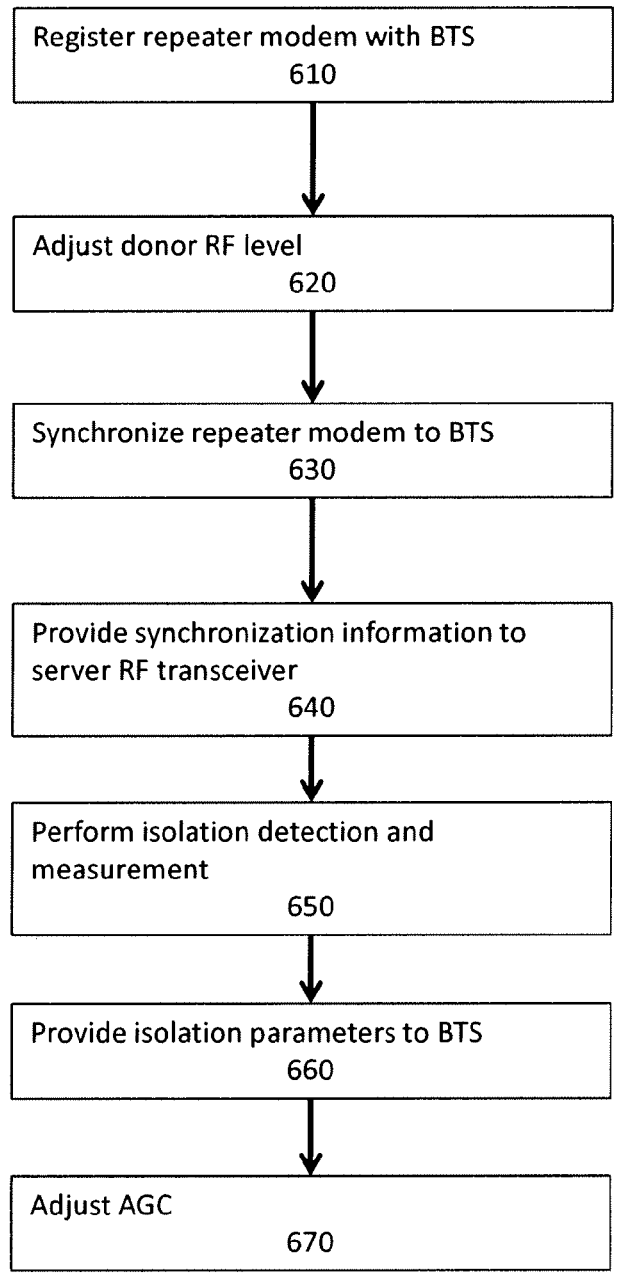
FIG. 6 is a flow chart of a method of operation of a repeater providing isolation measurement and self-oscillation prevention: and It will be noted that throughout the appended drawings, like features are identified by like reference numerals.

FIG. 6 is a flow chart of a method for testing the isolation status of an RF repeater that includes a donor RF transceiver, a server RF transceiver, a donor transmit antenna and a server receive antenna. At installation of the repeater, modem communication with the BTS using the Donor port is commenced. At step 610 the repeater registers with the BTS as any other SS device using the modem 330. During this stage the Server antenna transmit portion is shut off, but the receive portion is active. The repeater uplink output in the direction from the Donor antenna to the BTS is set in accordance to the standard protocol procedure, e.g., as specified in the 802.16 d/e standard.

At step 620, the RF output levels are adjusted and known to the processor 332 built into the modem 330. The RF levels are adjusted using calibrated and stored values for the repeater donor RF transceiver, to the levels required to maintain the optimum link SNR with the BT achieved during registration. Because the modem 330 is fully implemented in the repeater, all parameters of the link can be adjusted (e.g., symbol, timing, frequency offset, wireless frame parameters downlink and uplink time, allowed transmit and receive gaps, etc.). Synchronization parameters obtained during registration are provided and applied to the repeater server. After step 620 has been completed, the isolation detection and measurement step 650 can be performed during regular control message exchange between the repeater RF donor side and the BTS. The modem 330, by listening to the BTS transmission, is fully synchronized with the TDD operation of the BTS at step 630. This synchronization information is provided to the Server transceiver 322 at step 640. By knowing the exact timing of its own transmission, the modem 330 can schedule, capture and measure the RF energy present at the Server antenna 164 port, using the modem co-processor 332, during the transmission from the Donor antenna 162 port at step 650. The measurement and detection of this energy level is done as shown in FIG. 5. The isolation level becomes a critical parameter in the AGC algorithm since it determines the maximum amount of the gain allowable by the repeater device in order to prevent oscillation.

Based upon the measurement and detection step 650, isolation parameters are determined and provided to the BTS 110 at step 660 by utilizing the normal management channel for communication with the BTS 110 for the purpose of the OAM&P. Measurements can be repeated over time and temperature while the repeater normally operates in the field. As a consequence of using this method, the isolation status in the RF repeater installed in the shadow area can be easily tested without the help of special equipment. The repeater AGC algorithm can then be modified at step 670 based on the determined isolation parameter, to ensure that oscillation does not occur without requiring a service technician. The repeater is now a fully synchronized entity in the RF network, and it is able to control the exact timing and power level used to communicate back to the BTS during control message exchange between the repeater model and the BTS.

When starting the receiver operations on the server side when the repeater modem is processing control messages from the BTS, the repeater is able to measure the amount of RF leakage between the donor and server sides of the repeater. Since the repeater has knowledge of the content of the message that it transmits back to the BTW, a full correlation between the measured signal on the server side and the signal transmitted on the donor side can be established. This way accurate isolation measurements are obtained so proper gain can be selected and applied for the repeater operations. The repeater is under full control of the BTS, the repeater can be turned on or off, the link parameters can be changed and accurate isolation measurement can be obtained so that repeater gain can be controlled and oscillation can be minimized.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of establishing and maintaining isolation status of a radio frequency (RF) repeater that includes a donor RF transceiver, a server RF transceiver, a donor transmit antenna, a server receive antenna and a modem device, in a time-division-duplexed (TDD) system, the method comprising the steps of:

registering the RF repeater with a base transceiver station (BTS) using said modem device;

adjusting the donor RF output level using a calibrated value for the donor RF transceiver;

synchronizing the modem device to a BTS transmission received at the donor RF transceiver;

providing synchronization information to the server RF transceiver of the repeater via said modem device;

performing isolation detection and measurement between the donor transmit antenna and the server receive antenna of the RF repeater via said modem device to determine an isolation value during at least one of
    said registering of the RF repeater, and
    one or more scheduled management bursts,
wherein the step of performing isolation detection and measurement further comprises
    detecting a received signal preamble from the modem at the server antenna receiver of the RF repeater,
    evaluating, at the modem coupled to the donor transmit antenna, a preamble output level,
    evaluating, at the modem coupled to the server receive antenna, a preamble power input level,
    calculating the isolation value between the donor transmit antenna and the server receive antenna using the evaluated preamble output level and preamble power input level; and
adjusting, by said modem device, automatic gain control parameters of the donor RF transceiver and the server RF transceiver based upon the calculated isolation value.

2. The method of claim 1 wherein the preamble is an OFDM/OFDMA signal preamble.

3. The method of claim 1 wherein the step of performing isolation detection and measurement is performed by a co-processor coupled to the modem device and the donor and server transceivers.

4. The method of claim 3 wherein the preamble is generated by the modem device and output to the donor RF transceiver.

5. The method of claim 1 wherein the step of performing isolation detection and measurement further comprises
    determining RF output power levels from the donor transmit antenna and RSSI levels received by the server receive antenna and
    calculating said isolation value based on said determined RF output power levels and said determined RSSI levels.

6. The method of claim 1 further comprising the step of comparing said isolation value with stored isolation values to determine the adjustments to be made to said automatic gain control parameters.

7. The method of claim 1 wherein the modem device is an IEEE 802.16 compliant modem.

8. The method of claim 6, wherein said step of performing isolation detection and measurement is performed during said registering of the RF repeater and during a plurality of scheduled management bursts.

9. The method of claim 8, further comprising
    establishing a logical channel link between said modem and said BTS, said BTS controlling said RF repeater via said logical channel link;
    transmitting, by said modem, said isolation value to said BTS via said logical channel link;
    said BTS performing said comparing of said transmitted isolation value with stored isolation values to determine the adjustments to be made to said automatic gain control parameters;
    transmitting, by said BTS, said determined adjustments to said modem; and further wherein
    said adjusting of said automatic gain control parameters is performed by said modem based on said determined adjustments.

10. A processor, in a radio frequency (RF) repeater, for establishing and maintaining isolation status of the RF repeater that includes a donor RF transceiver, a server RF transceiver, a donor transmit antenna, a server receive antenna and a modem device, in a time-division-duplexed (TDD) system, the processor performing the steps of:
    registering the RF repeater with a base transceiver station (BTS),
    said registering further comprising performing isolation detection and measurement between the donor transmit antenna and the server receive antenna of the RF repeater via said modem device to determine an isolation value;
    wherein the step of performing isolation detection and measurement further comprises:
    detecting a received signal preamble from the BTS at the server RF transceiver of the RF repeater;
    evaluating a preamble output level from the donor transmit antenna;
    evaluating a preamble power input level from the server receive antenna; and
    calculating an isolation value between the donor transmit antenna and the server receive antenna using the evaluated preamble output level and preamble power input level;
    adjusting the donor RF output level using a calibrated value for the donor RF transceiver;
    synchronizing the modem device to a BTS transmission received at the donor RF transceiver;
    providing synchronization information to the server RF transceiver of the repeater via said modem device; and
    adjusting automatic gain control parameters of the donor RF transceiver and the server RF transceiver based upon said isolation value via said modem device.

11. The processor of claim 10 wherein the preamble is an OFDM/OFDMA signal preamble.

12. The processor of claim 11 wherein the preamble is generated by the processor and output to the donor transmit transceiver.

13. The processor of claim 11 wherein the step of performing isolation detection and measurement further comprises determining RF output power levels from the donor transmit antenna and RSSI levels received by the server receive antenna and calculating an isolation value based on said determined RF output power level and said determined RSSI levels.

14. The processor of claim 11 further comprising the step of comparing calculated isolation value with a stored isolation value to determine the adjustments to be made to said automatic gain control parameters.

15. The processor of claim 11 wherein the preamble is defined by IEEE 802.16.

16. The processor of claim 10, wherein said step of performing isolation detection and measurement is additionally performed during a plurality of scheduled management bursts.

17. A radio frequency (RF) repeater comprising:
    a donor RF transceiver coupled to a donor antenna having a transmit portion and a receive portion;
    a server RF transceiver coupled to a server antenna having a transmit portion and a receive portion;
    a modem, coupled to the donor transceiver and the server transceiver, the modem performing steps comprising:

registering the RF repeater with a base transceiver station (BTS);
adjusting the donor RF output level using a calibrated value for the donor RF transceiver;
synchronizing said modem to a BTS transmission received at the donor RF transceiver;
providing synchronization information to the server RF transceiver of the repeater via said modem;
performing, during at least one scheduled management burst, isolation detection and measurement between the transmit portion of the donor antenna and the receive portion of the server antenna of the RF repeater via said modem to determine an isolation value;
wherein the step of performing isolation detection and measurement further comprises:
detecting a received signal preamble from the BTS at said server RF transceiver of the RF repeater;
evaluating a preamble output level from the transmit portion of the donor antenna;
evaluating a preamble power input level from the receive portion of the server antenna; and
calculating an isolation value between the transmit portion of the donor antenna and the receive portion of the server antenna using the evaluated preamble output level and preamble power input level; and
adjusting automatic gain control parameters of the donor RF transceiver and the server RF transceiver based upon said isolation value.

18. The repeater of claim 17 wherein the preamble is an OFDM/OFDMA signal preamble.

19. The repeater of claim 17 further comprising
establishing a logical channel link between said modem and said BTS, said BTS controlling said RF repeater via said logical channel link;
transmitting, by said modem, said isolation value to said BTS via said logical channel link;
determining, by said BTS, said automatic gain control parameters of the donor RF transceiver and the server RF transceiver based on said isolation value,
transmitting, by said BTS, said automatic gain control parameters to said modem; and further wherein
said adjusting of said automatic gain control parameters is performed by said modem based on said automatic gain control parameters transmitted by said BTS.

* * * * *